No. 846,563. PATENTED MAR. 12, 1907.
H. W. HANWELL.
LAMP PENDANT.
APPLICATION FILED SEPT. 11, 1906.

3 SHEETS—SHEET 1.

No. 846,563. PATENTED MAR. 12, 1907.
H. W. HANWELL.
LAMP PENDANT.
APPLICATION FILED SEPT. 11, 1906.

3 SHEETS—SHEET 3.

Witnesses

Inventor:
Herbert W. Hanwell
By Wm. E. Boulter, Attorney

UNITED STATES PATENT OFFICE.

HERBERT WILLIAM HANWELL, OF NORTHAMPTON, ENGLAND.

LAMP-PENDANT.

No. 846,563.   Specification of Letters Patent.   Patented March 12, 1907.

Application filed September 11, 1906. Serial No. 334,170.

*To all whom it may concern:*

Be it known that I, HERBERT WILLIAM HANWELL, a subject of the King of England, and a resident of Northampton, in the county of Northampton, England, have invented certain new and useful Improvements in Lamp-Pendants, of which the following is a specification.

This invention is for improvements in or relating to lamp-pendants adapted to be hung either from the ceiling or wall and has reference to that type of pendant in which a rotatable drum is employed to receive the flexible tubing for, say, a gas-fitting or the flexible cord for an electric-light fitting. In pendants of this kind the drum is usually spring-controlled, so that when the lamp-fitting has been drawn down to a low position it may be returned by raising it, whereupon the spring rotates the drum and takes up the slack of the cord or tubing. To obviate nice adjustment of the tension of the spring relatively to the weight of the fitting, a friction device is often employed therewith. The friction device is sometimes used in conjunction with a pawl-and-ratchet mechanism, so that when the fitting is drawn down it operates against the friction member, but when it is released the friction member is inoperative and the return movement effected by the pawl overrunning the ratchet.

The present invention refers to a specific form of apparatus of the latter type in which the friction member is held stationary by a pawl-and-ratchet mechanism while the fitting is drawn down, but rotates with the drum upon which the slack of the cord or tube of the fitting is wound when the fitting is raised. The pawl for this purpose is stationary, and the ratchet is carried by the friction member, so that the ratchet overruns the pawl during the return movement of the drum.

Figure 1:
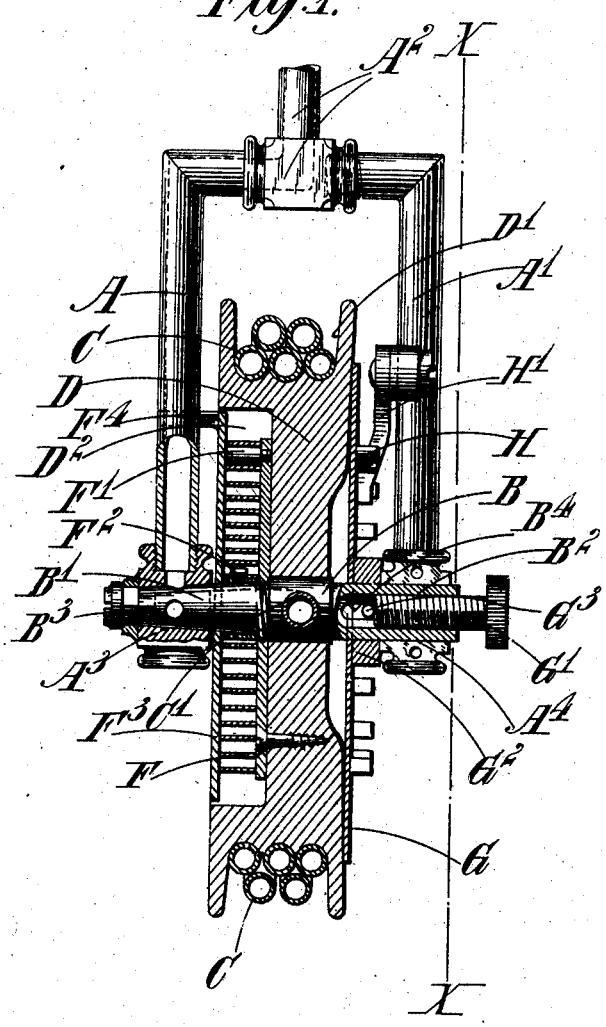
Figure 2:
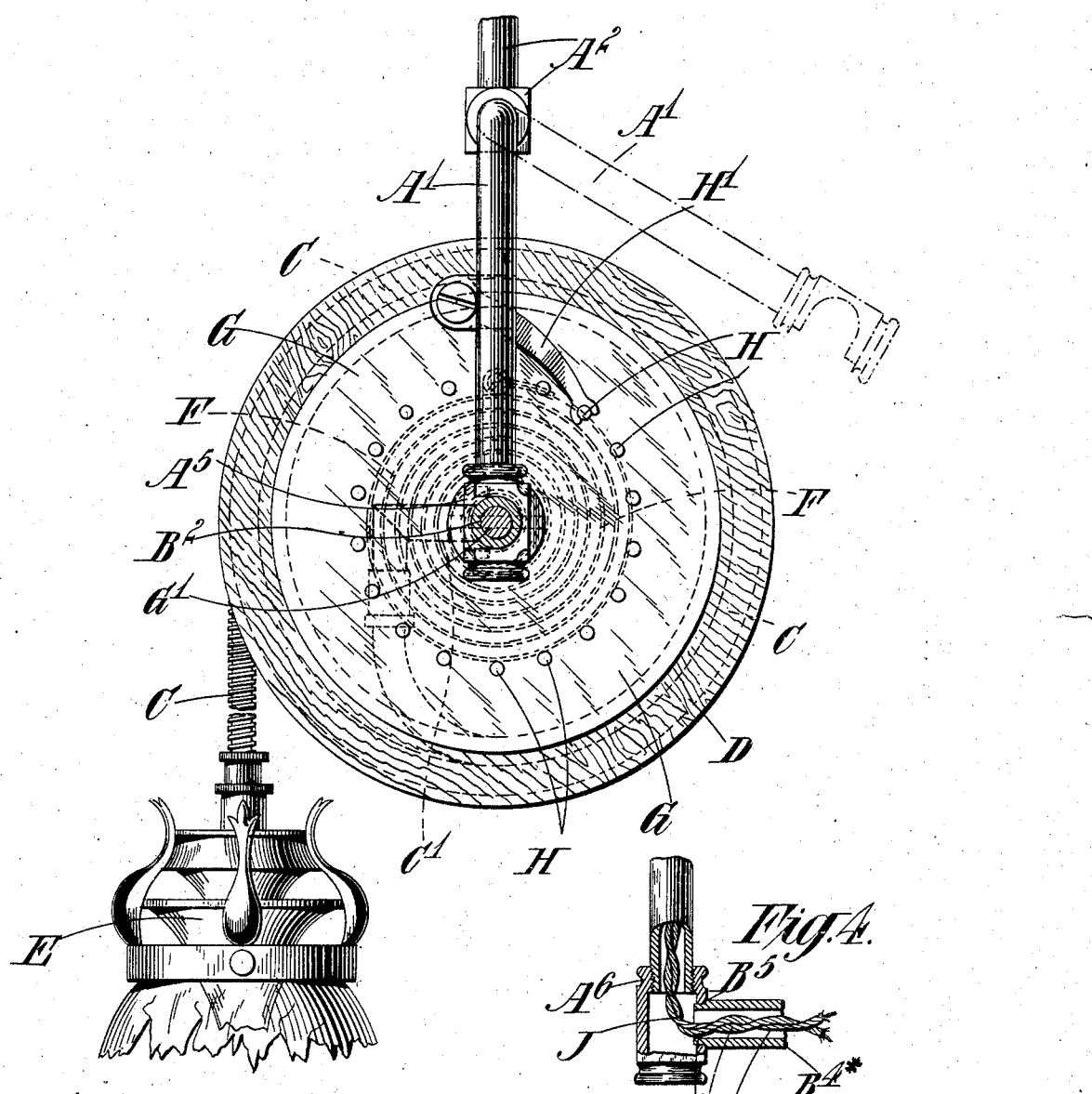
Figure 3:
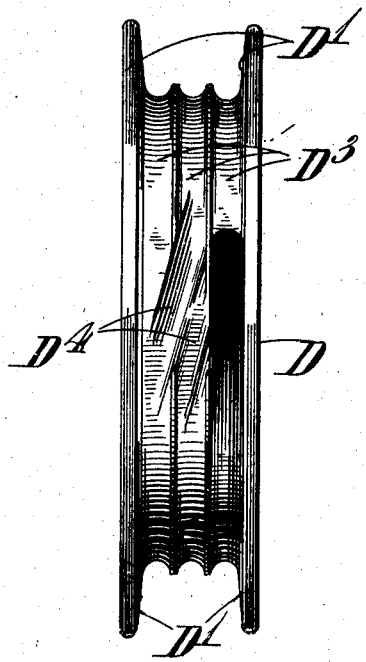
Figure 5:
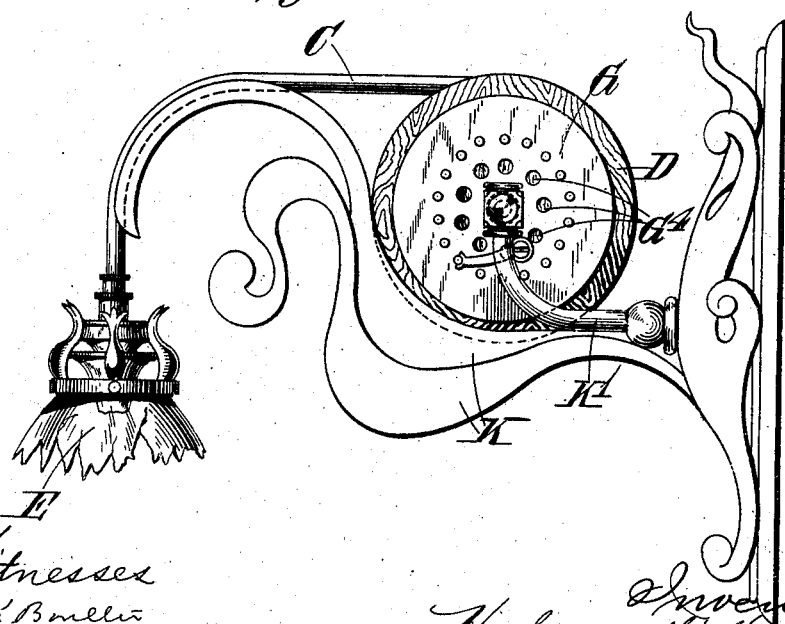

In the accompanying drawings, Figure 1 is a central vertical section through a pendant constructed according to one method of carrying out this invention. Fig. 2 is a side elevation of the same viewed from the right of Fig. 1. Fig. 3 is a detail view of the drum.
Fig. 4 is a modified detail of part of the apparatus shown in Fig. 1, and Fig. 5 is a side elevation of the pendant as adapted for hanging from a wall.

Like letters indicate like parts throughout the drawings.

The apparatus shown in Figs. 1 to 3, inclusive, is for employment with gas, and comprises a supporting-yoke having arms A A', provided with means for connection at $A^2$ to the gas-supply pipe. The yoke is thus secured in a pendent position and is provided at the free ends of the arms A A' with bearings $A^3$ $A^4$, adapted to receive a spindle B. The end B' of the spindle is conical, and the bearing $A^3$ is correspondingly-shaped, so that a gas-tight fitting is obtained between these two parts; but the end $B^2$ of the spindle enters a plain bearing and does not require close fitting therein. Fast on the spindle B and mounted between the arms A A' of the yoke is a drum D, conveniently of wood. The drum has a peripheral groove D' and also a recess $D^2$ in one face. Within the drum and communicating with the end B' of the spindle, which is hollow, is an elbow C', to the free end of which a flexible conduit C is secured. The drum D is bored to receive the end of the coil or conduit C, which passes through to the elbow C', where it is made fast, and the groove D' in the drum is sufficiently deep to receive the number of turns of the conduit corresponding to the amount of adjustment in length desired.

The spindle B is only hollow as far as the elbow C', and the end B' is perforated, as shown at $B^3$. The perforations $B^3$ register with the hollow interior of the arm A, and a clear way is provided from the supply-pipe through the connection $A^2$ to the interior of the arm A. A sufficient number of orifices or perforations $B^3$ are provided, so that whatever position the spindle B may be placed in gas will always have free passage from the supply-pipe to the interior of the conduit C, whence it passes to any suitable lamp-fitting E, secured to the end of the conduit.

It will be seen that if the fitting is drawn down the conduit C will be unwound from the drum D, and the latter will be correspondingly rotated. To return the drum, a light spring F is provided. This is mounted in the recess $D^2$ in the face of the drum and secured at one end to a pin F', fast in the drum, and at the other end to a boss $F^2$, constituting part of a plate $F^3$. The plate $F^3$ closes in the recess $D^2$ and carries a projection or lug $F^4$, which lies in the path of the arm A. The tension of the spring F operates in the direction to maintain the lug $F^4$ against the arm A, so that the plate is held against rotation and acts as a fulcrum or fixed point for the inner end of the spring.

To take the weight of the fitting, and thus prevent the same from running out against the action of the spring F, a friction-disk G is employed. This is mounted free upon the spindle B on the opposite side of the drum to that occupied by the spring F and bears against the face of the drum. To keep the disk in contact with the face of the drum, the end $B^2$ of the spindle is hollowed and screw-threaded to receive a screw G', and over the spindle and between the plate G and the arm A' of the yoke a collar $G^2$ is placed. A pin $G^3$ passes through the collar and spindle $B^2$, which latter is slotted, as shown at $B^4$, so that the collar may be moved endwise upon the spindle. The end of the screw G' bears upon the pin $G^3$, and thus forces the collar $G^2$ against the disk G, so that this latter is made to bear against the drum D. On the outer face of the disk G a series of pins H are provided, and a pawl H' is pivoted to the arm A' of the yoke and adapted to engage the pins H. It will thus be seen that when the fitting E is forcibly pulled down the drum will be rotated against the action of the spring F, but will slide upon the face of the disk G, which is held against rotation in this direction by the pawl H'. If, however, the fitting is raised by hand, the drum D and disk G will be rotated under the action of the spring F and the slack of the conduit C coiled upon the drum. By advancing the screw G' farther into or withdrawing it farther from the end $B^2$ of the spindle B the pressure with which the disk G bears against the drum D may be adjusted to suit fittings of any weight, and it will be noted that it is this friction device which is relied upon to counteract the tendency of the fitting to run down and that the spring F, although operating in the same direction, is in no way relied upon as a counterbalance, but only serves to return the drum when relieved of the weight of the fitting.

It will be seen that the head of the screw G' may be allowed to project beyond any suitable casing in which the drum and its mechanism may be inclosed, so that it is always accessible for adjustment. The outside limit of any such casing is indicated by the chain-line X on the right hand of Fig. 1. It should also be noted that the friction-disk and the screw by which it is adjusted are both mounted upon the spindle B, which carries the drum, whereby the spindle is made to take the whole of the end thrust between these parts.

The arm A' may be solid or tubular, as desired, but does not communicate with the gas-passage, and preferably pivots freely in the connection $A^2$. Its lower end is provided with a detachable cap $A^5$, so that by removing this the arm may be swung into the position indicated in chain-line, Fig. 2, and the drum and spindle bodily removed from the yoke.

The face of the channel D' is grooved, as shown at $D^3$, and at the point where the end of the conduit C passes into the drum for connection to the elbow C' the grooves are cross-cut, as shown at $D^4$. This arrangement insures the proper winding of the conduit upon the drum, as should one coil mount upon the other the cross-cut tends to deflect it so that it slides off into its proper groove.

For electric-light fittings the conical end B' of the spindle B is obviously unnecessary, so that the spindle may be carried in any convenient manner in the end of the yoke-arm, as shown in Fig. 4, in which the end $B^4$ of the spindle is reduced, as shown at $B^5$, to enter the end $A^6$ of the yoke-arm. The end of the spindle is left open, and the flexible wires (shown at J) may be led down the yoke-arm and through the spindle, whence they pass through the drum and out to the periphery of the same in a similar manner to that already described with reference to the elbow C' and the conduit C. The flexible wires will of course in this case take the place of the conduit, and the fitting will be suspended therefrom, as will be readily understood.

To insure that the wire shall not be damaged, it is found convenient to twist two wires round each other—say, three times—as shown at J', the twists being in the direction in which the drum rotates when drawing the fitting up, so that when the fitting is drawn to its lowest point, and supposing the drum rotates six times during this operation, the wires will be first untwisted and then twisted up in the opposite direction three turns. It is found that this arrangement is quite practicable, whereas if the wires required twisting six times in either direction damage would probably occur.

Adjustable pendants are sometimes employed in combination with a wall-bracket, and Fig. 5 shows the form of pendant already applied in this manner to a bracket K. The drum D is supported by a pair of arms K' thereon, although only one arm is shown in the drawings. The flexible tube C is led over the end of the bracket, which is trough-shaped to receive it, and, if desired, rollers may be mounted in this part of the bracket to reduce friction. These, however, are not shown in the drawing.

The friction-disk G may be perforated, as shown at $G^4$, to render it more or less resilient; but these perforations are not essential and are only shown in Fig. 5.

What I claim as my invention, and desire to secure by Letters Patent, is—

1. In an adjustable lamp-pendant, the combination of a rotatable drum, means for supporting the drum, a lamp-fitting, a coil connected at one end to the fitting and at the other end to the winding-face of the drum, a spring control for the drum whereby after rotation in one direction it may be returned in the other, a friction member for applying a constant retarding action against rotation of the drum in the direction for lowering the lamp-fitting, and means automatically operated by movement of the drum in the reverse sense whereby the friction member is rendered inoperative and the drum is thus freed from the retarding action throughout the whole range of its movement in the direction for raising the lamp-fitting, substantially as set forth.

2. In an adjustable lamp-pendant, the combination of a support, a spindle rotatably mounted therein, a drum fast on the spindle, a friction member mounted free on the spindle and in contact with the drum, a device for maintaining these two members in contact with each other, means for adjusting this device so that one of the members may be advanced relatively nearer to or allowed to retire from the other, a lamp-fitting, a coil connected at one end to the lamp-fitting and at the other end to the winding-face of the drum, a spring control for the drum whereby after rotation in one direction it may be returned in the other, means for holding the friction member against rotation with the drum in one direction and means whereby movement of the drum in the reverse sense automatically releases the friction member so that it rotates with the drum, substantially as set forth.

3. In an adjustable lamp-pendant, the combination of a support, a spindle rotatably mounted therein, a drum fast on the spindle, a friction member mounted free on the spindle and in contact with the drum, a set-screw carried by the spindle and operatively connected with one of the members thereon so that they are kept in engagement with each other, means for adjusting the set-screw in the longitudinal direction of the spindle so that one of the members may be advanced toward or allowed to withdraw from the other, a lamp-fitting, a coil connected at one end to the lamp-fitting and at the other end to the winding-face of the drum, a spring control for the drum whereby after rotation in one direction it may be returned in the other, means for holding the friction member against rotation with the drum in one direction, and means whereby movement of the drum in the reverse sense automatically releases the friction member so that it rotates with the drum, substantially as set forth.

4. In an adjustable lamp-pendant, the combination of, a support, a spindle rotatably mounted therein, a drum fast on the spindle, a lamp-fitting, a coil connected at one end to the lamp-fitting and at the other end to the winding-face of the drum, a spring control for the drum whereby, after rotation in one direction it may be returned in the other, a friction member mounted free on the spindle, a sleeve free to slide on the spindle and situated on that side of the friction member remote from the drum, a pin projecting from the sleeve into a longitudinal slot in the spindle, this end of the spindle being hollow, an adjusting-screw mounted longitudinally in the hollow end of the spindle and projecting beyond the same while its inner end bears against the pin of the sleeve so that by advancing the screw the sleeve and consequently the brake member may be advanced into frictional engagement with the side of the drum, and means for automatically holding the friction member against rotation with the drum when the latter tends to rotate in the direction to unwind the coil and lower the lamp-fitting and to release it when the drum rotates in the opposite direction, substantially as set forth.

5. In an adjustable lamp-pendant the combination of a supporting-yoke, a spindle rotatably mounted in the free ends of the yoke-arms, one end of the spindle being conical and fitting a correspondingly-shaped socket in the yoke-arm on that side, this arm and the corresponding end of the spindle being both hollow, ports in the conical end of the spindle communicating with the interior of the yoke-arm, means for connecting the yoke-arm with a gas-supply conduit, a drum fast on the spindle, a flexible conduit coiled on the drum and communicating at one end with the gasway in the spindle, a lamp-fitting carried at the other end of the conduit and in communication therewith, a spring control for the drum whereby, after rotation in one direction, it may be returned in the other direction, a friction member, means for forcing this member into frictional engagement with a friction-surface which moves in both directions with the drum, means for automatically holding the friction member against rotation with the drum when the latter tends to rotate in a direction to unwind the coil and lower the fitting, and to release it when the drum rotates in the opposite direction, a detachable bearing-cap for that end of the yoke-arm which engages the end of the spindle remote from the conical portion, and means for swiveling this yoke-arm relatively to the other so that when the cap is removed it can be swung clear of the spindle, substantially as set forth.

6. In an adjustable lamp-pendant the combination of, a supporting-yoke, a spindle rotatably mounted in the free ends of the yoke-arms, one end of the spindle being conical and fitting a correspondingly-shaped socket in the yoke-arm on that side, this yoke-arm and the corresponding end of the spindle being hollow, ports in the conical end of the spindle whereby the interior of the spindle is maintained in free communication with the interior of the yoke-arm, means for connecting the yoke with a gas-supply conduit, a drum fast on the spindle, a flexible conduit coiled on the drum and communicating at one end with the gasway in the spindle, a lamp fitting at the other end of the conduit and in communication therewith, a spring control for the drum whereby, after rotation in one direction, it may be returned in the other, a friction member carried free on the spindle, means for automatically holding the friction member against rotation with the drum when the latter tends to rotate in the direction to unwind the coil and lower the fitting, and to release it when the drum rotates in the opposite direction, a sleeve free to slide on the spindle and disposed on that side of the friction member remote from the drum, a pin projecting from the sleeve into a longitudinal slot in the spindle, this end of the spindle being hollow, an adjusting-screw mounted longitudinally in the hollow end of the spindle and projecting beyond the same while its inner end bears against the pin of the sleeve, a detachable bearing-cap for that end of the yoke-arm carrying this end of the spindle, and means for swiveling this arm relatively to the other so that, when the cap is removed, it can be swung clear of the spindle, substantially as set forth.

In testimony whereof I have signed my name to this specification in the presence of two subscribing witnesses.

HERBERT WILLIAM HANWELL.

Witnesses:
WILLIAM H. BALLANTYNE,
HARRY B. BRIDGE.